UNITED STATES PATENT OFFICE.

MARGARET A. PARMETER, OF DENVER, COLORADO.

PROCESS OF DEHYDRATING AND RECOVERING VALUES FROM SLIMES.

1,415,387.  Specification of Letters Patent.  Patented May 9, 1922.

No Drawing.  Application filed November 24, 1919. Serial No. 340,221.

*To all whom it may concern:*

Be it known that I, MARGARET A. PARMETER, a citizen of the United States, residing at Denver, in the county of Denver and State of Colorado, have invented certain new and useful Improvements in Processes of Dehydrating and Recovering Values from Slimes; and I do hereby declare the following to be a full, clear, and exact description of the invention, such as will enable others skilled in the art to which it appertains to make and use the same.

This invention relates to dehydrating process and while particularly adapted to the dehydrating of slimes for the recovering of values in mining is not limited thereto.

An object of this invention is to provide a process of separating water from solid matter making up slimes in order that the solid matter may be easily transported and treated by some process for the recovery of the values in such slimes, for instance in mining operations. It has heretofore been difficult to separate the water from the solid matter making up the slimes and it is an object of this invention to provide a medium that will collect the solid matter and cause cohesion of the solid matter to cause it to form in particles larger than in its normal state in the slime in order to dehydrate it by passing through filters where in this normal state the solid matter would all itself pass through such filters. With these and other objects in view the invention consists in the combination and elements as more particularly described in the following specifications:

Slimes are in the nature of an emulsion and the particles of solid matter in such an emulsion are so fine in mining operation that it is difficult to provide a filter or other collector fine enough to allow the penetration of water and at the same time obstruct the solid in such slimes. I have found that I can by adding preferably about one hundredth of the weight of slime to be treated of finely powdered rosin cause the adherence of the fine particles of solid substance in the slimes to this finely powdered rosin and the formation of larger particles that can be easily obstructed. I have found that by using the said one percentum of rosin that I can place this slime in a container made preferably of porous brick and by gradually stirring in this finely powdered rosin collect substantially all the solid matter while the water is working its way through this porous brick. I have found that the finer the rosin is ground the better it functions for this purpose and I also have found that in grinding this rosin the addition of water is desirable to keep it from sticking while the grinding is being done. I have also found trituration is preferable. When I have thus properly utilized this binder, I have been enabled to collect in the receptacle as above described the solid matter in cakes when the water has all run off. Such cakes are then ready for treatment and I have found rosin further desirable in this relation for the further reason that where the slimes are subsequently smelted, the rosin will burn and add materially to the heat.

While the use of twenty pounds of rosin to the ton of slimes will be found satisfactory in the usual mining operation it will be found of advantage in some cases to materially increase the amount of rosin thereby hastening the process.

What I claim is:

1. A dehydrating process comprising mixing a pulverized resinous binder with a liquid containing finely divided solids in suspension and filtering said liquid.

2. A dehydrating process comprising triturating rosin and mixing said triturated rosin in the slime to be dehydrated and filtering the water in said slime through porous brick.

3. A dehydrating process comprising mixing powdered rosin with a slime and filtering the water from said slime.

4. A dehydrating process comprising adding to the slime substantially one percentum of finely powdered rosin and filtering said slime.

5. The process of recovering values from slime comprising adding rosin to said slime to collect the solid in said slime and educting the water from said slime and smelting the slime and rosin residue.

In testimony whereof I affix my signature.

MARGARET A. PARMETER.